United States Patent [19]
Ruter et al.

[11] 3,821,184
[45]*June 28, 1974

[54] ANTISTATIC AND DYEABLE THERMOPLASTIC MOLDING COMPOSITIONS AND SHAPED ARTICLES OF POLYOLEFINS

[75] Inventors: Jörn Rüter; Karl-Heinz Magosch; Konrad Rombusch, all of Marl; Ursula Eichers, Recklinghausen, all of Germany

[73] Assignee: Chemische Werke Huls Aktiengesellschaft, Marl, Germany

[ * ] Notice: The portion of the term of this patent subsequent to Oct. 31, 1989, has been disclaimed.

[22] Filed: Sept. 29, 1971

[21] Appl. No.: 184,938

[30] Foreign Application Priority Data
Oct. 2, 1970 Germany.............................. 2048444

[52] U.S. Cl..... 260/93.7, 260/88.2 S, 260/94.9 GB, 260/DIG. 19
[51] Int. Cl......................... C08f 29/02, C08f 45/00
[58] Field of Search........ 260/88.2 S, 93.7, 94.9 GB

[56] References Cited
UNITED STATES PATENTS
3,701,765  10/1972  Magosch et al............. 260/94.9 GB
3,708,464  2/1973  Rombusch et al........... 260/94.9 GB Primary Examiner—Joseph L. Schafer
Assistant Examiner—Edward J. Smith
Attorney, Agent, or Firm—Millen, Raptes & White

[57] ABSTRACT

Antistatic polyolefin molding compositions and articles containing 0.1 – 5.0% by weight, based on the polyolefin, of one or more compounds of the formula:

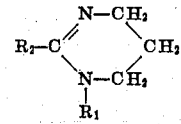

wherein $R_1$ and $R_2$ both are alkyl or alkenyl of 6–25 carbon atoms.

16 Claims, No Drawings

ANTISTATIC AND DYEABLE THERMOPLASTIC MOLDING COMPOSITIONS AND SHAPED ARTICLES OF POLYOLEFINS

BACKGROUND OF THE INVENTION

This invention relates to antistatic and dye-absorbing thermoplastic molding compositions and shaped articles of polyolefins containing certain nitrogenous additives.

As is known, polyolefin products have a strong tendency to attract dust during storage and use due to electrostatic charging, which greatly diminishes their usefulness.

Various means have been suggested to overcome these difficulties. Thus, the surfaces of the polyethylene articles can be coated with a composition which reduces electrostatic charging. However, such processes usually have the disadvantage that the effectiveness is lost as soon as the antistatic coating is worn by use or cleaning. A more prolonged effect is attained by incorporating the antistatic additive into the polymeric material and producing shaped articles from these mixtures. Among these additives are, for example, quaternary ammonium salts, polyalkylene glycols and polyalkylene glycol esters.

Still better properties are achieved with oxyethylates of alkanols and alkylaryl phenols (Belgian Pat. 536,623 and British Pat. 731,728). However, these compounds tend to bloom onto the surface when incorporated into the synthetic resin in an amount sufficient to achieve a satisfactory effect.

A further increase in antistatic effectiveness can be obtained employing nitrogen-containing compounds, such as, for example, amides and aminocarboxylic acid derivatives (French Pats. 1,377,803 – 808), oxazolines, and imidazolines and, to a still greater extent, with alkylamines (Belgian Pats. 655,182 and 655,183), especially oxyethylates of alkylamines (Belgian Pat. 645,800; French Pats. 1,345,827 and 1,322,626; German Published Application DAS 1,228,056), the bishydroxyethyl derivatives being the most effective antistatics of all those described heretofore. However, these compounds often have the disadvantage that, in the first few days after the manufacture of the molded polyolefin article, film, filament or fiber, the additive does not immediately achieve its full antistatic effectiveness. The result is that the electrostatic charge which develops during processing and which generally is very high, for example during separation from the mold in injection molding processes, cannot dissipate immediately, so that, within a few days, the molded articles become unattractive due to dust attraction. The situation is aggravated by the large amount of dust usually present in factory workshops.

A special problem is presented in the antistatic treatment of films, threads and fibers of polyolefins. It is known to those skilled in the art that, in order to obtain an antistatic effectiveness, it is important that the surface of the molded articles be coated with the antistat compound. This surface coating is considerably smaller in case of threads and fibers than in case of injection-molded, extruded, and deep-drawn articles, after admixing the same amount by weight of antistat, due to the fact that the surface area of threads and fibers is very large as related to the weight thereof. Accordingly, it is to be expected that the effectiveness of an antistatic agent in threads and fibers commences only after uneconomically large amounts have been added thereto. Such a behavior is also usually observed.

Consequently, there is a special need for antistatic agents which become effective in fibers already at low amounts of addition. Especially valuable would be an agent of this type which protects, in the same range of concentration, compact molded articles as well as fibers, so that it is possible to utilize the same molding composition for a great variety of manufacturing fields.

A large number of 2-fatty-alkyl oxazolines and imidazolines, as well as the N-derivatives thereof, are described in the patent literature. In contrast thereto, of the tetrahydropyrimidines, there are disclosed only specific esters with other heterocyclic compounds, for example:

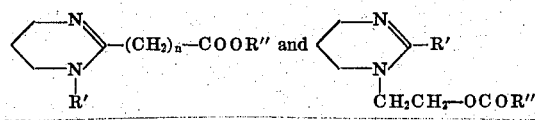

(U.S. Pat. Nos. 3,020,276 and 3,024,236). Copolymers of acrylic and vinyl compounds and N-vinyl tetrahydropyrimidines are also known. (Belgian Pat. 625,362).

A person skilled in the art had to conclude from this state of the art that only complicated tetrahydropyrimidines are effective, rather than the simple tetrahydropyrimidines, e.g., the 2-fatty-alkyl derivatives.

In general, the use of these additives have generally related to the antistatic treatment of molding compositions and shaped articles. The term "shaped articles", as used herein means the products of the injection molding, extrusion and deep-drawing processes, i.e., relatively compact articles, as opposed to films, filaments and fibers.

A special problem exists in the antistatic treatment of threads and fibers of polyolefins. In order to obtain full antistatic effectiveness, it is important, of course, that the total surface of the molded article is coated with the antistat. However, the surface coating achieved in the case of filaments and fibers is considerably less when employing the same amount by weight of antistat, due to the much higher surface area of filaments and fibers, per unit weight, compared with injection-molded, extruded and deep-drawn articles. Thus, an antistat which is fully effective when used with shaped articles often is effective in the case of filaments and fibers only at uneconomically high additive levels.

An equally important problem is their poor dyeability, in the case of threads and fibers of polyolefins, so that these fibers have found only minor use in the textile field, in spite of other various very advantageous properties. A variety of agents has been proposed to increase the dye absorption of threads and fibers of polyolefins, but such substances, when they strongly promote the dyeability, have the disadvantage that they produce only minor antistatic effects. Thus, the dyeability of polyolefin fibers and threads by complex dyes can be increased by adding metallic salts or metallic complexes to the polyolefin prior to spinning. (See DAS 1,292,311 or German Unexamined Published Application DOS 1,494,686). However, an additional disadvantage of this method is that the thus-obtained threads and fibers do not have an increased affinity to the inexpensive acid dyes and impart no antistatic effect whatever.

Another method for rendering polyolefin compositions more dyeable is to incorpoate therein more readily dyeable polymers, such as polyvinyl compounds, e.g., polyvinylpyridine, polyvinyl acetate, polyacrylates, polyacrylamides, polyaminoacrylates or copolymers of such vinyl compounds. (See French Pat. 1,422,396 or Japanese Pat. 4201/68). Another method consists of grafting these monomeric vinyl compounds onto the surface of the formed fibers. (See Japanese Pats. 8990/68 or 27 159/68). However, a simultaneous antistatic effect is not achieved with these compounds. It is also known that the dyeability of the polyolefin threads and fibers with acid dyes or dispersion dyes can be increased by incorporating into polyolefins basic condensation products of primary and secondary amines or polyamines and epichlorohydrin or polyepoxides. (See French Pat. 1,367,387 or German Application DOS 1,469,105 or DOS 1,645,017). These basic condensation polymers exhibit an antistatic effect because of their polyether and polyamine units. However, this effect is minor, since the compounds, due to their polymeric structure, are unable to diffuse from the interior of the fiber to the fiber surface. Consequently, the largest portion thereof remains in the interior of the fiber so that only a minor percentage of that incorporated in the polymer composition is available to increase the conductivity of the fiber on the surface thereof.

Therefore, the problem exists, which has not been solved heretofore satisfactorily of producing polyolefin molding compositions and shaped articles of polyolefins which simultaneously possess a high dye affinity and a high antistatic effect.

In the copending application of Magosch, Rombusch and Eichers, Ser. No. 84,886, filed Oct. 28, 1970, now U.S. 3,701,765 there is claimed the use of tetrahydropyrimidines of the formula

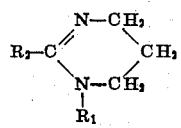

wherein $R_1$, inter alia, is alkyl or alkenyl of 1–5 carbon atoms, and $R_2$ is alkyl or alkenyl of 5–25 carbon atoms, i.e., the compound contains both a long chain and a short chain alkyl or alkenyl group in the molecule, as antistatic additives for polyolefins. Although these substances are highly effective as antistats, they do not promote the dyeability of threads and fibers formed from the resulting composition.

SUMMARY OF THE INVENTION

According to this invention, polyolefins are rendered antistatic with the advantages described above by incorporating therein 0.1 – 5.0 percent by weight, based on the polyolefin, of one or more compounds of the formula:

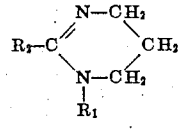

wherein $R_1$ and $R_2$ both are alkyl or alkenyl of 6–25 carbon atoms.

DETAILED DISCUSSION

It is very surprising that by using tetrahydropyrimidines containing two long chain alkyl chains, threads and fibers of polyolefins simultaneously become both highly dyeable and antistatic. Heretofore, nitrogen bases with two long chain alkyl groups have been considered by those skilled in the art to be ineffective as antistats. Likewise, in view of the "dilution" of the basic group in the molecule by the lengthening of the short alkyl chain, it was unexpected that the dyeability of the filaments and fibers, especially with respect to acid dyestuffs, would also be improved.

Polyolefins which can be rendered antistatic according to this invention include high- and low-pressure polymers of ethylene, propylene, butene-1, pentene-1, etc., in particular all polyethylene types having $\eta_{red}$ values of about 0.4 – 4.0, corresponding to average molecular weights of about 20,000 – 200,000; polypropylenes with $\eta_{red}$ values of about 1.5 – 7.0, corresponding to average molecular weights of about 100,000 – 800,000; and polybutenes-1 with $\eta_{red}$ values of about 1.0 – 6.0, corresponding to average molecular weights of about 500,000 – 3,000,000 and copolymers and polymer mixtures thereof. Preferred are isotactic polypropylenes with $\eta_{red}$ values of 1.7 – 2.5, corresponding to average molecular weights of 150,000 – 300,000. Of the compounds of Formula I, preferred are those wherein $R_1$ is an alkyl or alkenyl of 8–18, more preferably 10–14, carbon atoms, and $R_2$ is alkyl or alkenyl of 7–17, preferably 9–13, carbon atoms.

Examples of $R_1$ are n-hexyl, n-octyl, 2-ethylhexyl, trimethylhexyl, n-decyl, n-undecyl, n-undecenyl, n-dodecyl, n-tridecyl, n-tetradecyl, hexadecyl, octadecyl, octadecenyl, eicosyl, doeicosyl and pentaeicosyl. Preferred are the octyl, decyl, dodecyl, tetradecyl and octadecyl.

Examples of such $R_2$ groups are n-heptyl, 2-ethylpentyl, n-nonyl, n-undecyl, n-tridecyl, n-heptadecyl, heptadecenyl, and heneicosyl residues. Preferred are heptyl, nonyl, undecyl, tridecyl and heptadecyl.

Examples of compounds of Formula I are, for example, 1-dodecyl-2-nonyltetrahydropyrimidine, 1-dodecyl-2-undecyltetrahydropyrimidine, 1-dodecyl-2-heptadecyltetrahydropyrimidine, 1-dodecyl-2-heptadecenyltetrahydropyrimidine, 1-octadecyl-2-heptadecyltetrahydropyrimidine and 1-octadecyl-2-heptadecenyltetrahydropyrimidine. These compounds can be produced in a conventional manner by reacting correspondingly substituted 1,3-propanediamines with carboxylic acids or a derivative thereof, such as, e.g., an ester or nitrile. Advantageously, carboxylic acids and 1,3-propanediamines are used as the starting compounds and the thus-produced water (2 mols per mol of tetrahydropyrimidine) is removed azeotropically from the reaction mixture, xylene preferably being used as the azeotropic agent. In addition, a number of other manufacturing methods are known which, however, are not of commercial significance.

The amounts of the above-disclosed antistatic agents incorporated into the polyolefins range usually between 0.1 and 5.0 percent by weight, based on the polyolefin. Preferred are amounts from 0.5 to 4.0 percent by weight, since these amounts provide complete protection against dust accumulation by electrostatic attraction even in case of very dry and warm air, without appreciably impairing the crack resistance of the highly crystalline types of polyolefins. If lower concentrations are employed, the protection against electrostatic charging is substantially lower. Such protection although insufficient for dry air, may still be sufficent when the polyolefin is stored in moist air. Higher concentrations than 5.0 percent are normally unnecessary since they do not result in any further improvement in antistatic properties. The additive can be incorporated into the polyolefin in various ways. For example, the polyolefin and the selected tetrahydropyrimidine can be converted directly into a homogeneous composition in a mixer. For this purpose, any commerical high-speed mixer generally is suitable. It is also possible to first admix the polyolefin with a higher than desired percentage of the antistat and then arrive at the desired antistat content by admixing additional polyolefin to this mixture. Also the selected tetrahydropyrimidine can be dissolved, dispersed, suspended, or emulsified in a suitable organic solvent, and the solution, dispersion, suspension, or emulsion then added to the pulverized polyolefin and the mixture thoroughly stirred. The solvent can thereafter be removed, for example, by distillation. A solvent suitable for this purpose is methanol. Other readily distillable solvents can also be employed for this purpose.

A well proven method is to first produce a granulated polyolefin having a high concentration of tetrahydropyridmidine and then bringing this granulated composition to the desired tetrahydropyrimidine content during processing by admixing thereto additional granulated polyolefin which is free of that additive.

The novel antistatic polyolefin compositions can also contain, e.g., 0.01 – 3.0 percent by weight, based on the polyolefin, of other conventional antistats, such as, for example, polyethylene glycols and polypropylene glycols, polyols, e.g., glycerin and the monoethers and monoesters thereof, the diethers and diesters, and the ether-esters, and/or alkyl-amines and fatty acid amides, as well as other additives customary in filament and fiber production, e.g., dyestuffs, pigments, stabilizers, lubricants, plasticizers and fillers.

For example, there can be added to the polyolefin stabilizers which prevent the slight yellowing of the antistats which can occur upon the prolonged exposure to high temperatures, e.g., phosphites, preferably didecylphenylphosphite, triphenylphosphite, tris(nonylphenyl)phosphite and tris(nonylphenol + 9 mols ethylene oxide) phosphite. These additives usually are added in amounts of about 0.01 – 0.4 percent by weight, calculated on the polyolefin. The addition of an alkanesulfonate, e.g., sodium pentadecanesulfonate, in an amount of about 0.1 – 2.0 percent by weight, calculated on the polyolefin, has the same advantageous effect. Likewise, UV-stabilizers can also be added.

The antistatic behavior of the threads and fibers is tested by the ash dust testing method and by measuring the surface resistance according to DIN 53 482 VDE 0303, Part 3. (In this test, + means ash attraction, – means no ash attraction). For further details thereof, see Ser. No. 84,886, filed Oct. 28, 1970, now U.S. Pat. No. 3,701,765. These tests are conducted on small (10 g.) polyolefin strands wound off from the spinning bobbins.

In the following examples, the selected quantities of the claimied tetrahydropyrimidines are blended with 3 kg. of isotactic polypropylene powder having a relative viscosity of 2.0 ($c = 0.1$ g. per 100 ml. at 135° C. in decaline). The thus-obtained powder is then granulated in an extruder. In the comparative examples, the same procedure is followed. The thus-obtained granulated material is spun into filaments in a melt spinning apparatus at 245°–295° C. by melting and extrusion through an 8-hole spinnerette (diameter of the holes 0.25 mm.) These filaments are then wound onto bobbins. By means of melt-spinning, mono- or polyfilaments can be produced which are further processed into continuous fibers or staple fibers, texturized yarns, or staple yarns.

The fibers are preferably drawn (oriented) after their manufacture, e.g., at a stretching ratio of 2:1 to 10:,1 and then wound onto bobbins. This drawing can be conducted at temperatures of between 80° and 150° C. in an apparatus heated with hot air, steam or the like. From the thus-obtained bobbins of drawn filaments, 10 g. strands are wound off, and the surface resistance is measured with a tera-ohmmeter (produced by Kamphausen; electrode spacing 1 cm.) and the attraction of cigarette ashes thereto (ash dust test; height 0.5 cm. above the ash) after rubbing with a cellulose rag (after 24 hours of storage at 23° C., 60 percent relative humidity).

Employing the same testing method, the surface resistance of the polyolefin threads and fibers is measured after being washed once in household washing machines (gentle or boiling cycle) and after dyeing in a conventional dyeing process.

The novel polyolefin threads and fibers produced according to this invention with a tetrahydropyrimidine as defined herein incorporated therein, as manufactured as well as after washing or dyeing, have a surface resistance of $\leq 10^5$ M$\Omega$ and do not attract ashes in the ash test. In contrast thereto, corresponding polyolefin threads and fibers which do not contain the antistat, exhibit a surface resistance of $\geq 10^7$ M$\Omega$ and strongly attract the ashes.

Fibers produced according to this invention likewise possess a remarkable affinity to acid dyes and dispersion dyes. A test dyeing step was conducted for 1 hour at 100° C. in dye baths containing 2 percent by weight of coloring agent, based on the fiber, with a liquor ratio of 1:40. The test dyeings with the acid dyes were conducted in the presence of 2 percent of acetic acid (60 percent strength) and 5 percent of sodium sulfate.

The dyeings with the dispersion dyes were carried out in the presence of 2 percent of acetic acid (60 percent strength) and 1 percent of a levelling agent. After dyeing, the yarns were thoroughly rinsed and additionally cleaned with a monionic surfactant (1 g./l. at temperatures of 40°–70° C.), in order to remove superficially bound dye.

In all cases, the yarns were intensively colored with the acid and dispersion dyes, whereas the corresponding polyolefin threads and fibers which lacked the antistat of the present invention, were dyed at most only to a very slight extent under the same dyeing conditions.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 1-3

In Examples 1-3, the selected amount of 1-dodecyl-2-nonyltetrahydropyrimidine (DNTHP) is added to isotactic polypropylene powder having a relative viscosity of 2.0, and the powdered mixture is granulated and spun in a melt spinning apparatus under the conditions shown below.

| | |
|---|---|
| Melting zone 1 | 225° C. |
| Melting zone 2 | 245° C. |
| Melting zone 3 | 270° C. |
| Extrusion speed | 15-18 m./min. |
| Conveying rate | 5.8-6.5 g./min. |
| Spinning draft | 30-35 |
| Windup speed | 640 m./min. |

The thus-produced filaments have the properties shown in Table 1.

TABLE I

| | Example 1 | Example 2 | Example 3 |
|---|---|---|---|
| DNTHP (%) | 1 | 1.5 | 3 |
| Titer (dtex) | 95/8 | 98/8 | 107/8 |
| Tensile elongation (%) | 457.5 | 408.9 | 464.6 |
| tensile strength [p/dtex] | 1.4 | 1.39 | 1.31 |
| Surface resistance (MΩ) | | | |
| W.L. (1) | $1.6 \cdot 10^3$ (—) | $1.6 \cdot 10^3$ (—) | $7 \cdot 10^2$ (—) |
| A.G.L. (2) | $6.2 \cdot 10^5$ (—) | $9 \cdot 10^2$ (—) | $3 \cdot 10^2$ (—) |
| A.B.L. (3) | $7 \cdot 10^5$ (—) | $1 \cdot 10^3$ (—) | $8 \cdot 10^2$ (—) |
| A.D. (4) | | $5 \cdot 10^4$ (—) | $3 \cdot 10^4$ (—) |
| Dyestuff affinity (5) | | | |
| "Acilansaphirol SE" | 2 | 3 | 3 |
| "Dispersolechtorange" | 2 | 2 | 2 |

(1) Without laundering;
(2) After gentle laundering (commercial alkanesulfonate gentle detergent, 60° C.)
(3) After boiling laundering (light detergent, 100° C.);
(4) After dyeing
(5) The color depth was judged in accordance with the following scale:
 0: no dye absorption
 1: slight dye absorption
 2: good dye absorption
 3: very good dye absorption

EXAMPLES 4-7

IN Examples 4-7, the selected amount of DNTHP is admixed to isotactic polyproplene powder having a relative viscosity of 2.0, the resulting powdered mixture is granulated, spun in the melt spinning plant under the conditions described for Examples 1-3, and then drawn.

| | |
|---|---|
| Drawing ratio | 5 : 1 |
| Drawing temperature | 120° C. |
| Temperature of the iron [pressing iron] | 120° C. |

The resulting filaments have the properties shown in Table II.

TABLE II

| | Example 4 | Example 5 | Example 6 | Example 7 |
|---|---|---|---|---|
| DNTHP (%) | 1 | 2 | 3 | 4 |
| Titer (dtex) | 42/8 | 44/8 | 41/8 | 45/8 |
| Tensile elongation (%) | 47 | 36 | 41 | 45 |
| tensile strength [p/dtex] | 4.5 | 5.1 | 4.3 | 4.1 |
| Surface resistance (MΩ) | | | | |
| W.L. | $7 \cdot 10^3$ | $4 \cdot 10^3$ | $1 \cdot 10^3$ | $4 \cdot 10^2$ |
| A.G.L. | $1 \cdot 10^4$ | $7 \cdot 10^3$ | $2 \cdot 10^3$ | $7 \cdot 10^2$ |
| A.B.L. | $9 \cdot 10^3$ | $1 \cdot 10^4$ | $2 \cdot 10^3$ | $9 \cdot 10^2$ |
| A.D. | $3 \cdot 10^5$ | $1 \cdot 10^5$ | $8 \cdot 10^4$ | $4 \cdot 10^4$ |
| Dyestuff affinity | | | | |
| "Acilansaphirol SE" | 2 | 3 | 3 | 3 |
| "Dispersolechtorange" | 1 | 2 | 2 | 2 |

EXAMPLES 8-10

In Examples 8-10, the selected amount of 1-dodecyl-2-heptadecenyltetrahydropyrimidine (DHETHP) is admixed with isotactic polypropylene powder having a relative viscosity of 2.0; the powdered mixture is granulated, spun by melt spinnning under the conditions described for Examples 1-3, and thereafter drawn.

| | |
|---|---|
| Drawing ratio | 5.2 : 1 |
| Drawing temperature | 120° C. |
| Temperature of the iron | 120° C. |

The thus-produced filaments have the properties shown in Table III.

TABLE III

|  | Example 8 | Example 9 | Example 10 |
|---|---|---|---|
| DHETHP (%) | 1 | 3 | 5 |
| Titer (dtex) | 41/8 | 45/8 | 42/8 |
| Tensile elongation (%) | 55 | 58 | 62 |
| tensile strength [p/dtex] | 5.4 | 4.9 | 4.1 |
| Surface resistance (MΩ) | | | |
| W.L. | $1 \cdot 10^4$ | $3 \cdot 10^3$ | $7 \cdot 10^2$ |
| A.G.L. | $4 \cdot 10^4$ | $8 \cdot 10^3$ | $1 \cdot 10^3$ |
| A.B.L. | $2 \cdot 10^4$ | $4 \cdot 10^3$ | $9 \cdot 10^2$ |
| A.D. | $7 \cdot 10^3$ | $9 \cdot 10^4$ | $7 \cdot 10^4$ |
| Dyestuff affinity | | | |
| "Acilansaphirol SE" | 2 | 3 | 3 |
| "Dispersolechtorange" | 1 | 2 | 2 |

Comparable results are obtained when 1-dodecyl-2-undecyltetrahydropyrimidine, 1-dodecyl-2-heptadecyltetrahydropyrimidine, 1-octadecyl-2-heptadecyltetrahydropyrimidine or 1-octadecyl-2-heptadecenyltetrahydropyrimidine is employed instead of DHETHP.

COMPARATIVE EXAMPLES 11-14

In Comparative Example 11, isotactic polypropylene (relative viscosity = 2.0) is employed without additive, and in Comparative Examples 12-14, the same polypropylene is mixed with the indicated amounts of polyvinylpyridine (PVP), and spun under the conditions described for Examples 1-3. The resulting filaments have the properties shown in Table IV.

TABLE IV

|  | Comparative Example 14 | Comparative Example 13 | Comparative Example 12 | Comparative Example 11 |
|---|---|---|---|---|
| PVP (% by weight) | 0 | 1 | 3 | 5 |
| Titer (dtex) | 92/8 | 94/8 | 94/8 | 92/8 |
| Tensile elongation (%) | 407.5 | 302 | 341 | 337 |
| tensile strength [p/dtex] | 1.46 | 1.12 | 1.1 | 1.0 |
| Surface resistance (MΩ) | | | | |
| W.L. | $>10^7$ (+) | $>10^7$ (+) | $>10^7$ (+) | $>10^7$ (+) |
| A.G.L | $>10^7$ (+) | $>10^7$ (+) | $>10^7$ (+) | $>10^7$ (+) |
| A.B.L. | $>10^7$ (+) | $>10^7$ (+) | $>10^7$ (+) | $>10^7$ (+) |
| A.D. | $>10^7$ (+) | $>10^7$ (+) | $>10^7$ (+) | $>10^7$ (+) |
| Dyestuff affinity | | | | |
| "Acilansaphirol SE" | 0-1 | 0-1 | 1 | 1 |
| "Dispersolechtorange" | 0 | 1 | 2 | 2 |

COMPARATIVE EXAMPLES 15-18

In Comparative Example 15, isotactic polypropylene (relative viscosity = 2.0) is employed without any additive, and in Comparative EXamples 16-18, the same polypropylene is mixed with the indicated amounts of PVP additive, spun under the conditions described for Examples 1-3, and thereafter drawn.

| Drawing ratio: | 5.4 : 1 |
|---|---|
| Drawing temperature: | 120° C. |
| Temperature of the iron: | 120° C. |

The resulting filaments have the properties shown in Table V.

TABLE V

|  | Comparative Example 15 | Comparative Example 16 | Comparative Example 17 | Comparative Example 18 |
|---|---|---|---|---|
| PVP (% by weight) | 0 | 1 | 3 | 5 |
| Titer (dtex) | 51/8 | 54/8 | 50/8 | 47/8 |
| Tensile elongation (%) | 49 | 59 | 54 | 54 |
| Tensile strength [p/dtex] | 5.6 | 4.8 | 5.0 | 4.7 |
| Surface resistance (MΩ) | | | | |
| W.L. | $>10^7$ (+) | $>10^7$ (+) | $>10^7$ (+) | $>10^7$ (+) |
| A.G.L. | $>10^7$ (+) | $>10^7$ (+) | $>10^7$ (+) | $>10^7$ (+) |
| A.B.L. | $>10^7$ (+) | $>10^7$ (+) | $>10^7$ (+) | $>10^7$ (+) |
| A.D. | $>10^7$ (+) | $>10^7$ (+) | $>10^7$ (+) | $>10^7$ (+) |
| Dyestuff affinity | | | | |
| "Acilansaphirol SE" | 0 | 0 | 1 | 1 |
| "Dispersolechtorange" | 0 | 1 | 2 | 2 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Antistatic and dyeable thermoplastic polyolefin compositions containing 0.1 – 5.0 percent by weight, based on the polyolefin, of a compound of the formula

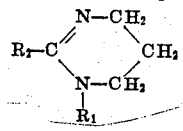

wherein $R_1$ and $R_2$ each are alkyl or alkenyl of 6–25 carbon atoms.

2. A composition of claim 1 wherein $R_1$ contains 8–18 carbon atoms.

3. A composition of claim 2 wherein $R_1$ contains 10–14 carbon atoms.

4. A composition of claim 1 wherein $R_2$ contains 7–17 carbon atoms.

5. A composition of claim 4 wherein $R_2$ contains 9–13 carbon atoms.

6. A composition of claim 1 wherein $R_1$ contains 8–18 carbon atoms and $R_2$ contains 7–17 carbon atoms.

7. A composition of claim 6 wherein $R_1$ contains 10–14 carbon atoms and $R_2$ contains 9–13 carbon atoms.

8. A composition according to claim 1 containing 1-dodecyl-2-nonyltetrahydropyrimidine.

9. A composition according to claim 1 containing 1-dodecyl-2-heptadecenyltetrahydropyrimidine.

10. A composition according to claim 1 wherein the polyolefin is polypropylene.

11. A composition according to claim 1 in the form of filaments or fibers.

12. A composition according to claim 11 wherein the polyolefin is isotactic polypropylene.

13. A composition according to claim 12 wherein $R_1$ contains 8–18 carbon atoms and $R_2$ contains 7–17 carbon atoms.

14. A composition according to claim 13 wherein $R_1$ contains 10–14 carbon atoms and $R_2$ contains 9–13 carbon atoms.

15. A composition according to claim 12 containing 1-dodecyl-2-nonyltetrahydropyrimidine.

16. A composition according to claim 12 containing 1-dodecyl-2-heptadecenyltetrahydropyrimidine.

* * * * *